3,236,209
NUCLEAR POWER PLANTS WITH SUPERHEATER
Albert Henri Maurice Vandeghen, 10 Rue Sainte Marie,
Liege, Belgium
Filed Jan. 18, 1960, Ser. No. 3,146
Claims priority, application Belgium, Jan. 16, 1959,
574,799
2 Claims. (Cl. 122—33)

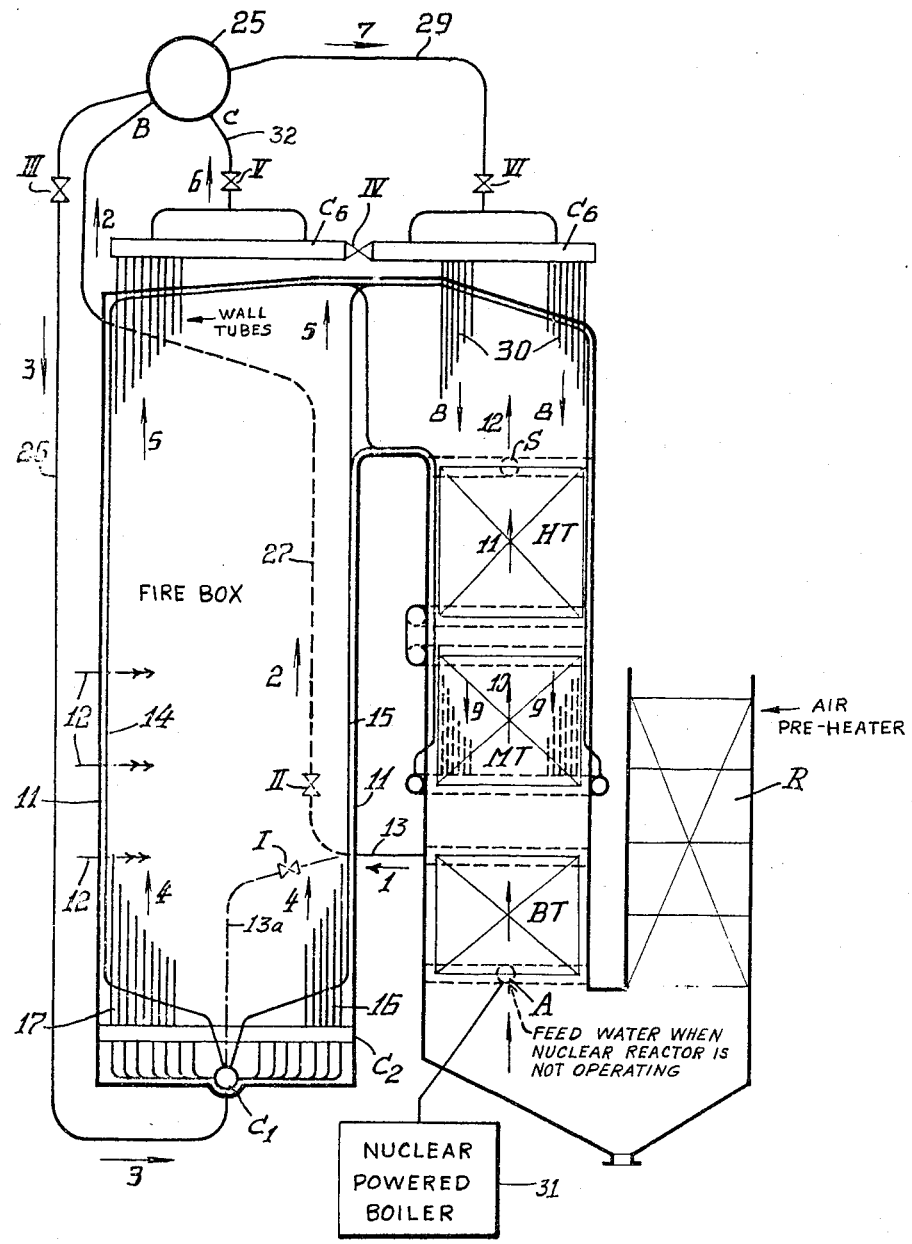

The present invention relates to nuclear power plants.

It is well known that the power and the thermic output or yield of a nuclear power plant can be increased by feeding the turbine or other utilization apparatus with super-heated steam instead of saturated steam, the super-heated steam being obtained by the provision of an independent superheater fired by a conventional fuel (coal or fuel oil).

This superheater receives the steam produced by the nuclear steam generator and increases its temperature before delivery to the apparatus which will utilize it such as a turbine. If desired, a second superheater may also be inserted in the steam-expansion circuit.

According to the present invention the power plant is equipped with means which provide the structure of a steam generator and which permit the plant to work as a steam generator using conventional fuel in the event that the production of saturated steam by the nuclear reactor is stopped.

In the drawing, the single figure is a diagram illustrating a steam generating plant embodying the invention.

Referring to the drawing, 11 designates a fire box fired by conventional fuel such as coal or oil. The burners are designated 12.

In the illustrated embodiment the independent superheater consists of four parts which are traversed consecutively by the steam-flow in the order named:

The low-temperature superheater BT;
The wall tubes of the fire box and of the superheater;
The average or medium-temperature superheater MT; and
The high-temperature superheater HT.

R designates an air-preheater.

Saturated steam generated by the nuclear reactor or nuclear powered boiler 31 enters the input A at the bottom of the low temperature superheater BT. The steam leaves the low temperature superheater BT through a pipe 13 as indicated by the arrow 1 and is directed through a valve I and a pipe 13a to the collector C1 at the bottom of the fire box wall tubes. The valve II is closed, thereby shutting off pipe 27. The fire box wall tubes comprise a front bank 14, a rear bank 15 and lateral banks 16 and 17 which are served by the interconnected collectors C1 and C2. Pipe 26 leading to collector C1 is shut off by a closed valve III.

The steam rises as indicated by arrows 4 and 5 through the fire box wall tubes 14, 15, 16 and 17 to a header C6 which communicates through an open valve IV with a similar header C7 above the superheater. The steam then passes downwardly as indicated by arrows 8 and 9 through the wall tubes 30 of the superheater to lateral collectors C4 and C5 from which it flows upwardly as indicated by arrows 10 and 11 through the medium temperature superheater MT and the high temperature superheater HT. The superheated steam leaves the high temperature HT through an outlet S as indicated by the arrow 12 for delivery to utilization means (not shown) such as a steam turbine.

During operation of the nuclear reactor 31, valves V and VI are also closed so that a supplementary boiler vessel or drum 25 located above the headers C6 and C7 is completely excluded from the system by closed valves II, III, V and VI.

When the nuclear reactor 31 is shut off, valves II, III, V and VI are opened and valves I and IV are closed. Instead of feeding saturated steam to the inlet A, feed water is supplied to the low temperature superheater BT which then operates as an economizer. The heated feed water flows through the pipe 13 as indicated by arrow 1, and through valve II and pipe 27 as indicated by the arrow 2. The water enters the drum 25 at B.

Water from the drum 25 is fed downwardly through the valve III and pipe 26 as indicated by the arrow 3 to the collector C1 and enters the fire box wall tubes 14, 15, 16 and 17. The resulting steam flows upwardly as indicated by the arrows 4 and 5 arriving in the header C6. From header C6, the steam flows through pipe 32 and valve V as indicated by the arrow 6 to the drum 25, entering the supplementary boiler vessel or dum at C. Saturated steam flows, as indicated by arrow 7, through pipe 29 and valve VI to the header C7 from which it flows to the outlet S as previously described.

While I have shown and described what I believe to be the best embodiment of my invention, it will be apparent to those skilled in the art that various changes and modifications may be made therein without departing from the spirit and scope of the invention as defined in the appended claims.

What I claim is:

1. A nuclear power plant, comprising a nuclear-powered boiler for generating saturated steam, a low temperature superheater, a medium temperature superheater, a high temperature superheater having its input connected to the output of said medium temperature superheater, a fire-box including wall tubes, means for feeding saturated steam from said boiler to the input portion of said low temperature superheater, first conduit means connecting the output portion of said low temperature superheater to the lower portion of said fire-box wall tubes, second conduit means connecting the upper portion of said wall tubes to said medium temperature superheater, a collector formed of two elements separated by a valve, a supplementary boiler vessel, connecting pipes extending from said supplementary boiler vessel to said lower portion of said fire-box wall tubes and to said collector, one of said two elements communicating with said upper portion of said wall tubes and the other of said elements communicating with said medium temperature superheater, said pipes being provided with valves, and means for adjusting said valves whereby said plant is adapted to operate as a non-nuclear steam generator when the production of saturated steam by said nuclear powered boiler is stopped, said low temperature superheater then being connected by adjustment of said valves for operation as an economizer.

2. A nuclear power plant, comprising a nuclear-powered boiler for generating saturated steam, a low temperature superheater, a medium temperature superheater, a high temperature superheater having its input connected to the output of said medium temperature superheater, a fire-box including wall tubes, means for feeding saturated steam from said boiler to the input portion of said low temperature superheater, first conduit means connecting the output portion of said low temperature superheater to the lower portion of said fire-box tubes, second conduit means connecting the upper portion of said wall tubes to said medium temperature superheater, a collector formed of two elements separated by a valve, a supplementary boiler vessel, connecting pipes extending from said supplementary boiler vessel to said lower portion of said fire-box wall tubes and to the collector, one of said two elements communicating with the upper portion of the wall tubes and the other of said elements communicating with said medium temperature superheater, said pipes being provided with valves, means for adjusting the positions of said valves, and pipe means connecting the outlet of said low temperature superheater to said supplementary boiler vessel, whereby said plant is adapted to operate as a non-nuclear steam generator when the production of steam by said nuclear-powered boiler is stopped, said low temperature superheater then being connected for operation as an economizer.

References Cited by the Examiner

UNITED STATES PATENTS

| | | | |
|---|---|---|---|
| 1,972,052 | 8/1934 | La Mont | 122—39 |
| 2,806,454 | 9/1957 | Jackson | 122—485 |
| 2,905,157 | 9/1959 | Schroeder et al. | 122—485 |
| 2,997,032 | 8/1961 | Wedel | 122—33 |
| 3,007,456 | 11/1961 | Murray et al. | 122—33 |

FOREIGN PATENTS

| | | |
|---|---|---|
| 1,189,953 | 3/1959 | France. |
| 679,083 | 9/1952 | Great Britain. |
| 809,240 | 2/1959 | Great Britain. |

FREDERICK L. MATTESON, Jr., *Primary Examiner.*

SAMUEL LEVINE, JAMES W. WESTHAVER, PERCY L. PATRICK, *Examiners.*